Feb. 10, 1948.                T. T. GOLDSMITH, JR., ET AL                2,435,680
APPARATUS FOR ELECTRICALLY TESTING MATERIAL
Filed Feb. 26, 1944
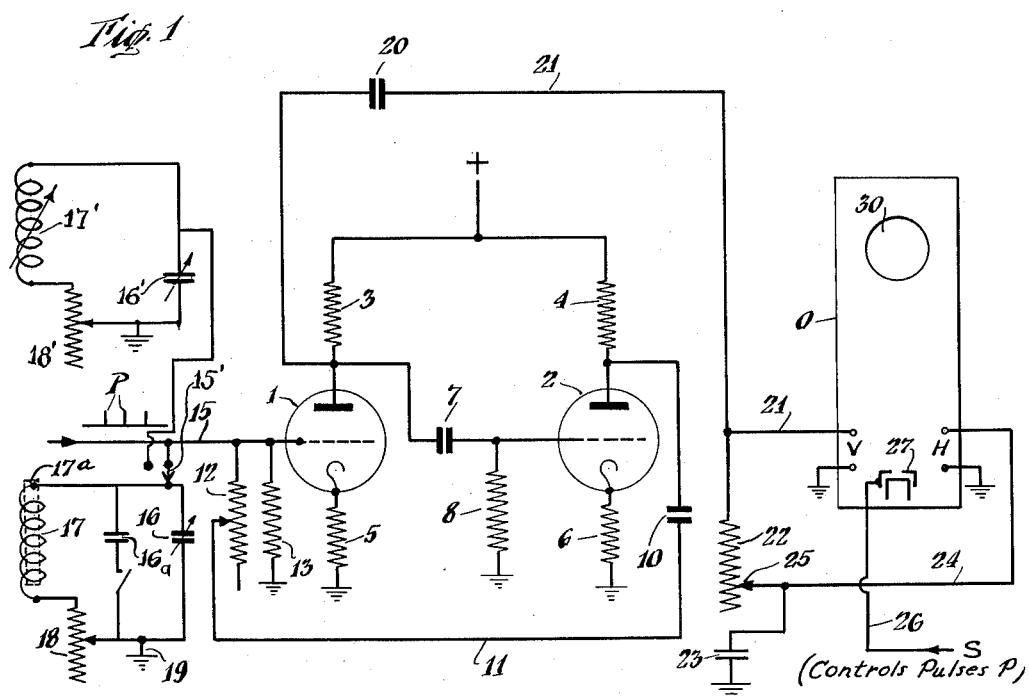
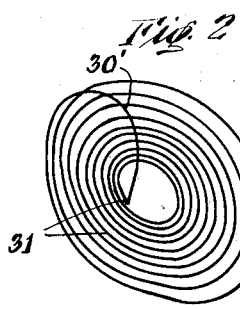
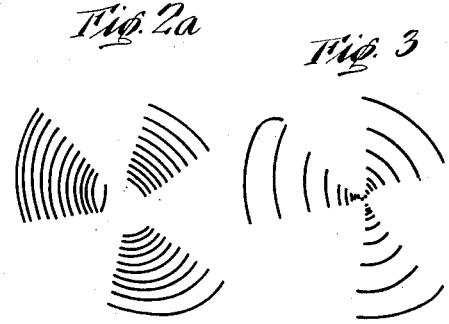
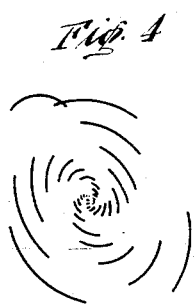
Thomas T. Goldsmith, Jr.
Estle Ray Mann
INVENTORS
BY
Charles W. Mortimer
ATTORNEY Patented Feb. 10, 1948

2,435,680

UNITED STATES PATENT OFFICE 2,435,680

APPARATUS FOR ELECTRICALLY TESTING MATERIAL

Thomas T. Goldsmith, Jr., Cedar Grove Township, Essex County, and Estle Ray Mann, Upper Montclair, N. J., assignors to Allen B. Du Mont Laboratories, Inc., Passaic, N. J., a corporation of Delaware Application February 26, 1944, Serial No. 524,010

7 Claims. (Cl. 175—183)

1

This invention relates to a process for investigating magnetic properties, dielectric properties, and electrical conducting properties of materials. In carrying out the process, apparatus is used by means of which the dielectric properties of non-metallic materials, copper losses in watts, i. e., current in amperes squared times resistance in ohms and other core losses of metal can be examined. Selection of coils and frequency of oscillation for determining such examinations are hereby facilitated. Different magnetic core losses due to different heat treatments of cores can also be compared with each other. The invention is also suitable for determining dielectric characteristics of insulating or partially insulating materials used as the dielectric medium of condensers, for example.

In carrying out the invention an oscillator is used in which the regenerative feedback is so regulated or adjusted that the negative resistance of the circuit is almost but not quite equal to the positive resistance. The circuit of the oscillator is energized by an electrical impulse so that oscillations are started and are then damped down. The output is impressed across the deflection system of an oscillograph with suitable phase shift so that spiral cyclographs are obtained. The cyclographs may be blanked at suitable intervals when desired to show phase shift.

The invention may be understood from the description in connection with the accompanying drawing, in which:

Fig. 1 is a diagram of connections illustrating an embodiment of the invention; and Figs. 2, 2a, 3, 4 and 5 illustrate sorts of cyclographs that may be obtained.

In the drawings, reference characters 1 and 2 indicate vacuum tubes so connected that they form an oscillator. The plates of these tubes are connected through resistors 3 and 4, respectively, to a positive source of potential and the cathodes are biased by resistors 5 and 6.

The plate of tube 1 is coupled by capacitor 7 to the grid of tube 2 which is provided with grid leak 8. The plate of tube 2 is coupled by capacitor 10 and lead 11 to variable resistor 12 which is connected to the grid of tube 1 that is provided with a grid leak 13.

The lead 15 to the grid of tube 1 extends from a pulse generator, not shown, that is timed. The grid tank circuit of tube 1 comprises a variable capacitor 16 and an inductor 17 which is connected to a variable resistor 18. This circuit is grounded at 19.

2

The plate of tube 1 is coupled by capacitor 20 and lead 21 to one side of the vertical deflecting system V of the oscillograph O, the other side being grounded. The lead 21 is also connected to a phase shifting device consisting of a variable resistor 22 in series with a capacitor 23 which is grounded. A lead 24 extends from adjustable contact 25 on the variable resistor 22 of the phase shifter to one side of the horizontal deflection system H of the oscillograph O, the other side being grounded, so that the phase of the signal that is applied to the horizontal deflection plates can be changed.

A signal S is applied through lead 26 from a source not shown to the grid 27 of the cathode ray tube 30 to provide blanking of the beam at suitable intervals to assist in measurement of phase angles along the spiral pattern.

The operation is as follows:

The coil that is to be used for testing materials is located or connected as the inductor 17 of the tank in the grid circuit of tube 1. The feedback from tube 2 through capacitor 10 to the grid of tube 1 is adjusted by variable resistor 12 so that there is almost enough regeneration to sustain oscillations. Steep wave front pulses P are fed in through lead 15 from any suitable source to the grid of tube 1 at regular intervals and with sufficient amplitude to start the oscillations that are damped. The decrement of these oscillations is varied as desired by changing the portion of the resistor 12 that is in the circuit, thus varying the regenerative feedback from tube 2.

The output of the oscillator is coupled by capacitor 20 and leads 21 and 24 with sufficient phase difference to the two respective deflection systems V and H of the oscillograph O to give a spiral pattern or cyclograph. Illustration of such cyclographs are shown in Figs. 2 to 5, inclusive.

An impulse P fed in by lead 15 causes oscillations to begin which die down at a rate which can be controlled by adjustment of resistor 12. During this period of oscillations a cyclograph like that shown in Fig. 2 is produced on the face 30 of the oscillograph O. The fluorescent spot which traces the cyclograph first moves outwardly very rapidly as shown at 30' and gradually returns as shown by the spirals 31 decreasing around the center as the oscillations are quenched. The spiral can be caused to extend any part of the way down or all the way down to the intersection of the x and y axes by decreasing the frequency of the impulses fed in at 15 or by decreasing the feedback from tube 2, or both. Feedback sufficient to sustain continuous oscillations may produce a circle on the screen 30 with proper position of contactor 25 on resistor 22 and proper size of capacitor 23.

The signal S for blanking the cathode ray of the oscillograph O at intervals may be, for example, a square wave form having a frequency of 33,000 cycles per second. The pulses P should be generated in a suitable circuit controlled by the signal S. Such circuits are old and well known. The frequency of the pulses P may be 1000 pulses per second, for example. When the inductor 17 and capacitor 16 are set into damped oscillation by these pulses P, a suitable oscillation frequency would, for example, be 11,000 cycles per second as illustrated in Fig. 2. At such frequencies of S and P and the oscillator, the three sectors of the spiral of Fig. 2 would be blanked out as shown in Fig. 2a. When the oscillations are caused to die down to zero between pulses P applied to the grid of tube I the pattern looks like Fig. 3.

When a core material 17a is placed in the coil 17 as indicated in dotted lines in Fig. 1 the pattern changes. If this core material is magnetizable the cyclograph changes from Fig. 2a to something like Fig. 4 which shows that a change in phase of the damped oscillations has taken place. This change in phase is due to increased inductance of the coil 17 with the core in it. Fig. 4 also shows that there is a higher decrement in the circuit. The collapse of the spiral toward the center is due to the core losses. However, when a core material that is placed in coil 17 is non-magnetic and is a good conductor, the pattern changes from Fig. 2a to Fig. 5 which shows a phase shift in the opposite direction from that of Fig. 4. This figure also shows an increase in the decrement.

When a dielectric material is to be tested, it is placed between the plates of the capacitor 16. As materials of different dielectric constants are tested the spirals, Fig. 2a, will change to those similar to Figs. 4 and 5, the higher the dielectric constant the greater the phase shift indications.

Certain materials exhibit both magnetic properties and high conductivity. Where these characteristics are suitably balanced the cyclograms may change from Fig. 2a to Fig. 3 indicating that the phase shift due to magnetic properties is just compensated by the equal and opposite phase shift due to the eddy current conductivity property, resulting in the cyclogram of Fig. 3 in which the increased decrement of the damped oscillator is indicated by the oscillations going to zero. This cyclogram shows that no net phase shift occurred.

It has also been found that some materials which produce a change in phase in one direction at high frequencies will produce a change in phase in the opposite direction at low frequencies.

This invention has been found to be particularly useful in testing the magnetic properites and also the conducting properties of metals and other materials. Where qualities of materials depend upon the molecular structure thereof such materials can be tested by inserting them in the coil 17 and testing the magnetic properties thereof at low frequencies. On the other hand, where qualities of materials depend upon intercrystalline structure, samples of the materials can be tested by inserting them in the coil 17 and using high frequencies of the oscillator.

It has been found that when two oscillators of the sort described above are used together so that the second oscillator furnishes the blanking voltage to the grid 27 of the cathode ray tube O the frequency of this second oscillator can be easily controlled to give the pattern of Fig. 2a.

In practicing this invention it is sometimes desirable to make absolute measurements of the permeability of a material, the dielectric constant of the material, or the eddy current loss characteristics of a material. Variable resistor 18 can be calibrated to read certain of these characteristics directly, if desired. Any means of absolute determination can employ a calibrated capacitor 16a in parallel with capacitor 16. Then in use, an initial spiral pattern such as that illustrated in Fig. 2a is produced by suitable adjustment of driving frequency and adjustment of capacitor 16 and resistor 18. When the sample to be tested is metal it is used as a core of coil 17. When it is a dielectric it is placed in the capacitor 16. A change in the pattern is caused in either case. The pattern may be restored to its original appearance shown in Fig. 2a by re-adjustment of the calibrated capacitor 16a and adjustment of the resistor 18. The characteristics of the material under test can be ascertained from these calibrated readings.

When desired, the sample to be tested may be placed in the coil 17 or the capacitor 16 and the pattern thereby produced is observed on the oscillograph O. Then the terminal 15 is disconnected from the network 16—18 by switch 15' and connected to a standard or calibrated network of capacitance 16', inductance 17' and resistance 18' associated in a similar way. Each may be variable as indicated. When lead 15 is connected to this standard network, the standard network is adjusted to provide the same pattern as that produced when the sample under test is used in the network 16—18. Thus the permeability, dielectric constant or resistivity characteristics of the material under test may be ascertained from the calibrated readings on the dials. It has been found easier in some instances to rely upon duplicating a pattern rather precisely by re-adjustment of controls and determining the desired data by the changes in dial settings rather than by trying to ascertain the desired values from a change in the rather complex pattern on the face of the tube.

In some cases it may be desirable to substitute a standard component for only one rather than all of the components in the network 16—18.

The principles embodied in this system of testing are particularly advantageous in that the cathode-ray tube method of indication eliminates the older methods such as null indications or sluggish meter movement indications for determining duplicate conditions in a sample under test compared with a calibrated standard. The cathode-ray tube using this basic principle may be employed over very wide frequency ranges, not being limited to audible frequencies or mechanical meter movement frequencies. For example, this invention may be used with cathode-ray tubes operating at frequencies of 100 megacycles practically as readily as with frequencies of 1000 cycles per second.

What we claim is:

1. A device for investigating properties of solid material which comprises a vacuum tube oscillator having a tank circuit comprising a hollow coil and a condenser having a pair of separated plates, at least one of said members, coil and condenser, being adapted to receive a specimen of said material, an oscillograph connected to the output of said oscillator, means to apply said output to the respective deflection systems of said oscillograph with sufficient phase difference to produce a spiral pattern on the face of said oscillograph, and means to apply electrical impulses to said oscillator and impulses of a higher frequency to the beam of said oscillograph.

2. The device of claim 1 in which the impulses applied to said beam are an integral multiple of the number of impulses applied to said oscillator.

3. The device of claim 1 in which the frequency of said tank circuit is adjustable.

4. The device of claim 1 in which said oscillator is damped.

5. The device of claim 1 in which means are provided to vary the regenerative feedback of said oscillator.

6. The device of claim 1 in which a calibrated tank circuit is provided, and a switch is adapted to disconnect said first named tank circuit from said oscillator and connect said calibrated tank circuit to said oscillator.

7. The device of claim 1 in which a calibrated tank circuit having a variable frequency producing element is provided, and a switch is adapted to disconnect said first named tank circuit from said oscillator and connect said calibrated tank circuit to said oscillator.

THOMAS T. GOLDSMITH, JR.
ESTLE RAY MANN.

REFERENCES CITED

The following references are of record in the file of this patent:

UNITED STATES PATENTS

| Number | Name | Date |
|---|---|---|
| 2,010,189 | Hallowell, Jr. | Aug. 6, 1935 |
| 2,177,528 | Kidd | Oct. 24, 1939 |
| 2,214,625 | Peterson | Sept. 10, 1940 |
| 2,217,843 | Langer | Oct. 15, 1940 |
| 2,280,524 | Hansen | Apr. 21, 1942 |
| 2,380,929 | Ahier et al. | Aug. 7, 1945 |

FOREIGN PATENTS

| Number | Country | Date |
|---|---|---|
| 349,002 | Germany | Feb. 20, 1922 |
| 406,903 | Great Britain | Mar. 8, 1934 |
| 682,205 | France | May 24, 1930 |